United States Patent
McKee

(10) Patent No.: US 8,733,236 B2
(45) Date of Patent: *May 27, 2014

(54) MATCHBOX OVEN

(75) Inventor: Philip R. McKee, Frisco, TX (US)

(73) Assignee: Ovention, Inc., Dallas, TX (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/236,695

(22) Filed: Sep. 20, 2011

(65) Prior Publication Data

US 2013/0068211 A1    Mar. 21, 2013

(51) Int. Cl.
*A47J 37/04*    (2006.01)

(52) U.S. Cl.
USPC .................................................. 99/443 C

(58) Field of Classification Search
USPC ............... 99/385, 386, 393, 396, 401, 443 R, 99/443 C, 467, 477
See application file for complete search history.

(56) References Cited

U.S. PATENT DOCUMENTS

| | | | | |
|---|---|---|---|---|
| 3,910,175 A | * | 10/1975 | Smith | ............................. 99/474 |
| 4,244,284 A | * | 1/1981 | Flavan et al. | .................... 99/327 |
| 4,556,043 A | | 12/1985 | Bratton | |
| 5,717,192 A | | 2/1998 | Dobie et al. | |
| RE37,706 E | * | 5/2002 | Chung | ............................. 99/404 |
| 6,880,545 B2 | | 4/2005 | Heber et al. | |
| 2005/0132899 A1 | | 6/2005 | Huang et al. | |
| 2005/0205547 A1 | | 9/2005 | Wenzel | |
| 2007/0137633 A1 | * | 6/2007 | McFadden | .................. 126/21 A |
| 2008/0156201 A1 | * | 7/2008 | Cook | ......................... 99/443 R |
| 2008/0216812 A1 | | 9/2008 | Dougherty | |
| 2009/0090252 A1 | * | 4/2009 | Ewald et al. | .................... 99/483 |

OTHER PUBLICATIONS

McKee, Philip—U.S. Appl. No. 13/077,143, filed Mar. 31, 2011.

* cited by examiner

*Primary Examiner* — Tu B Hoang
*Assistant Examiner* — Brandon Harvey
(74) *Attorney, Agent, or Firm* — Quarles & Brady LLP; George E. Haas

(57) ABSTRACT

A matchbox oven is disclosed. The matchbox oven includes a housing, a slider, a mover and a heat source. The housing includes a cavity having a first and second openings. The mover moves the slider in and out of the cavity through the first and second openings. The heat source provides heat to the cavity for heating up any food item placed on a portion of the slider located within the cavity. The slider, which is configured to receive food items, includes multiple stoppers to serve as oven covers for preventing heat within the cavity from escaping through the first and second openings. When necessary, a portion of the slider can also be utilized as a heat sink for lowering the temperature of the cavity during oven operation.

7 Claims, 5 Drawing Sheets

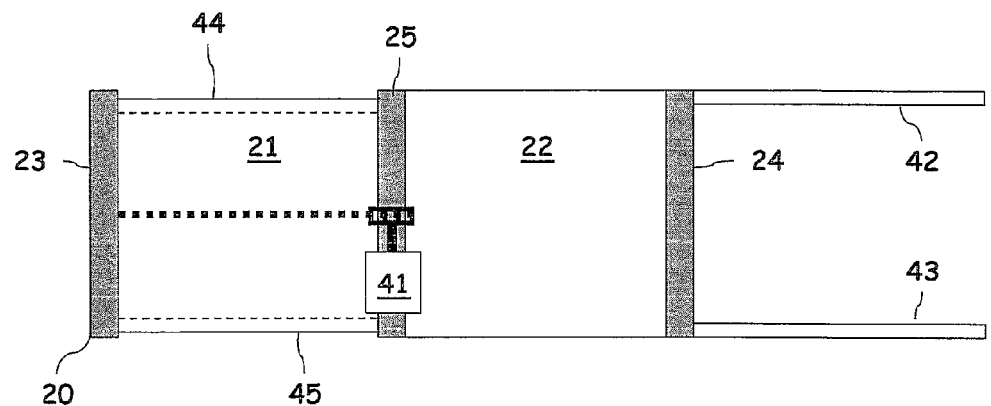
Figure 4a
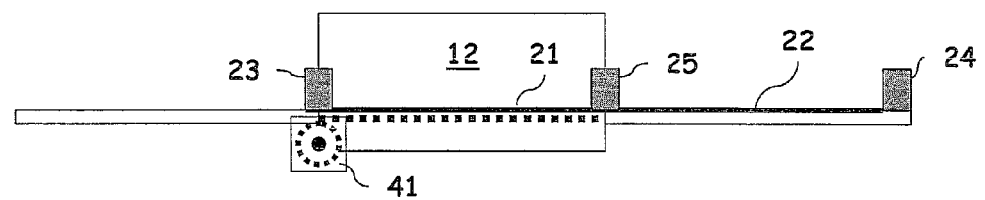
4b
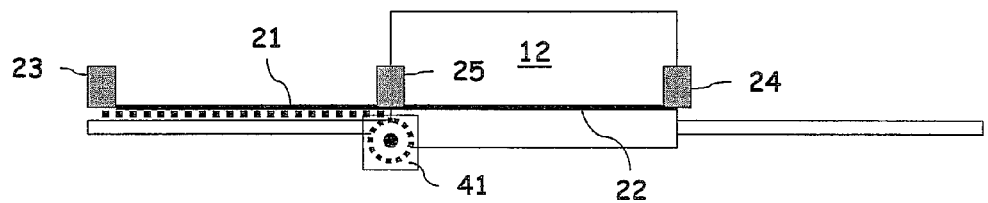
4c

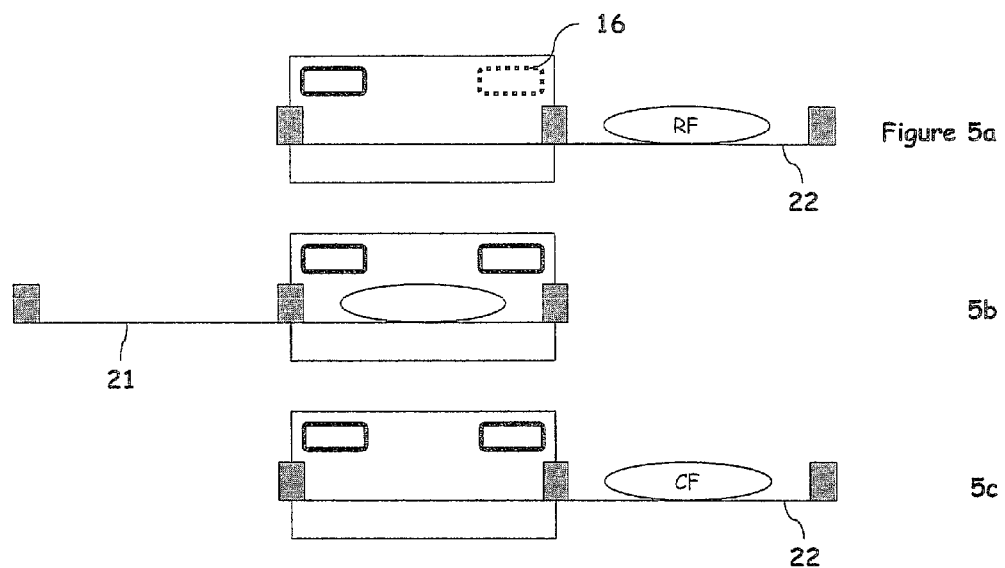

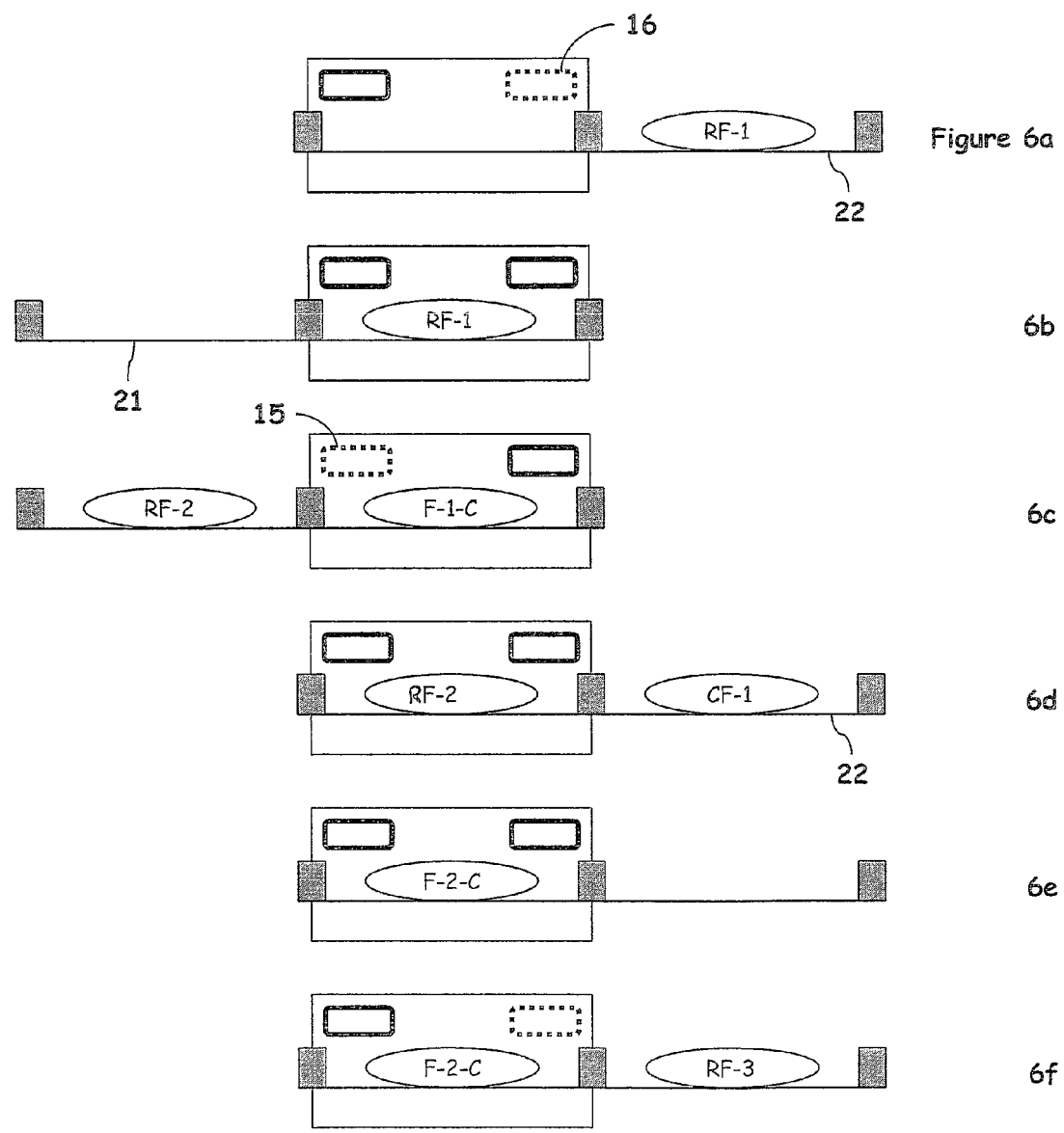

MATCHBOX OVEN

RELATED PATENT APPLICATION

The present patent application is related to copending application U.S. Ser. No. 13/077,143, filed on Mar. 30, 2011.

BACKGROUND OF THE INVENTION

1. Technical Field

The present invention relates to ovens in general, and in particular to a matchbox oven capable of providing continuous food cooking while minimizing heat loss.

2. Description of Related Art

A conveyor oven typically has a first opening through which uncooked food enters and a second opening at the opposite end of the oven through which cooked food exits. A stainless steel conveyor belt is commonly used to carry food items through a heated cavity between the first and second openings. The conveyor belt extends past both openings sufficiently to allow safe insertion and retrieval of food items. This arrangement allows food items to be placed on the conveyor belt on a continuous basis to achieve sequential steady-state cooking.

When food items offered by a commercial foodservice operation such as a restaurant are to be cooked at the same heat transfer profile for the same amount of time, a conveyor oven is particularly advantageous. A foodservice personnel needs only set the temperature, blower speed and conveyor belt speed as necessary to cook the selected foods. After the above-mentioned three parameters have been set, the conveyor oven can be operated continuously without any further adjustments. As such, even a person unskilled in the art of cooking is able to prepare high-quality cooked food products simply by placing them on the conveyor belt of a conveyor oven. The ease of operation and high throughput make conveyor ovens highly desirable in restaurants and other commercial foodservice settings.

However, conveyor ovens also have their disadvantages. For example, most commercial foodservice operations offer a variety of food items, such as pizza, chicken, vegetables and pies. Even a single food order at a restaurant may include multiple types of food items. Conveyor ovens are very efficient when cooking similar food items, but not so for cooking a variety of food items that require vastly different cooking times and heat transfer profiles. In addition, conveyer ovens are not very energy efficient because the two openings allow tremendous heat loss during their operation, and the lost heat must be replaced in order to maintain a steady cooking temperature. Furthermore, the heat that escapes from conveyor ovens must be extracted, typically via an air conditioning system, so that the ambient temperature of the kitchen area in which the conveyor ovens reside does not increase beyond an uncomfortable level for foodservice personnel. All of the above adds to the cost of foodservice operations when using conveyor ovens.

Consequently, it would be desirable to provide a flexible oven that is energy-efficient as well as operationally efficient.

SUMMARY OF THE INVENTION

In accordance with a preferred embodiment of the present invention, a matchbox oven includes a housing, a slider, a mover and a heat source. The housing includes a cavity having a first and second openings. The mover moves the slider in and out of the cavity through the first and second openings. The heat source provides heat to the cavity for heating up any food item placed on a portion of the slider located within the cavity. The slider, which is configured to receive food items, includes multiple stoppers to serve as oven covers for preventing heat within the cavity from escaping through the first and second openings. When necessary, a portion of the slider can also be utilized as a heat sink for lowering the temperature of the cavity during oven operation.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 4a-4c are a top view and side views of the slider within the matchbox oven from FIG. 1, in accordance with a preferred embodiment of the present invention;

FIGS. 5a-5c illustrate a method of cooking when only one of food loading sections of the matchbox oven from FIG. 1 is being used, in accordance with a preferred embodiment of the present invention; and FIGS. 6a-6f illustrate a method of cooking when both food loading sections of the matchbox oven from FIG. 1 are being used, in accordance with a preferred embodiment of the present invention.

DETAILED DESCRIPTION OF A PREFERRED EMBODIMENT

Figure 1:
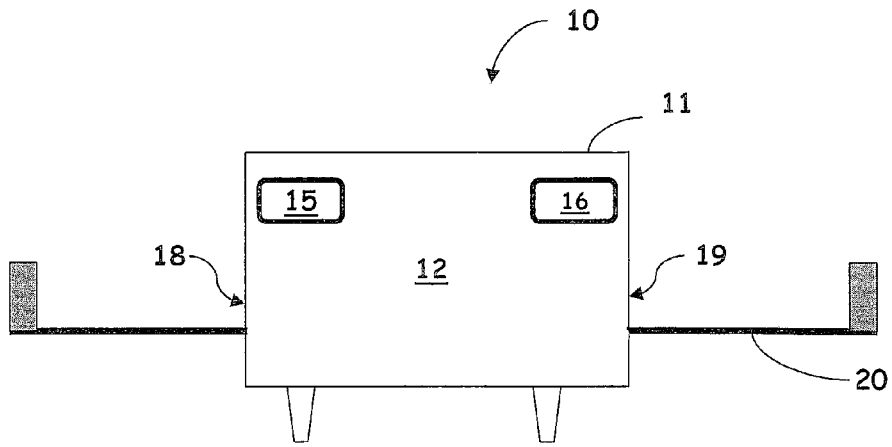
FIG. 1 is a front view of a matchbox oven, in accordance with a preferred embodiment of the present invention.

Referring now to the drawings and in particular to FIG. 1, there is depicted a front view of a matchbox oven, in accordance with a preferred embodiment of the present invention. As shown, a matchbox oven 10 is defined by a housing 11 having a cavity 12. Housing 11, as well as cavity 12, has a first opening 18 and a second opening 19. Matchbox oven 10 includes a heating and airflow system (not shown) to supply heat to cavity 12 for heating up any food items that have been carried into cavity 12 through either first opening 18 or second opening 19 via a slider 20.

Matchbox oven 10 also includes a first control panel 15 and a second control panel 16. An operator can enter operating parameters, such as cooking temperature, cooking time, blower speed, etc., via first and second control panels 15, 16 to effectuate cooking controls on any food items placed within cavity 12. First and second control panels 15, 16 are preferably implemented with touchscreens but they can also be implemented with keypads and liquid crystal displays (LCDs).

Figure 2:
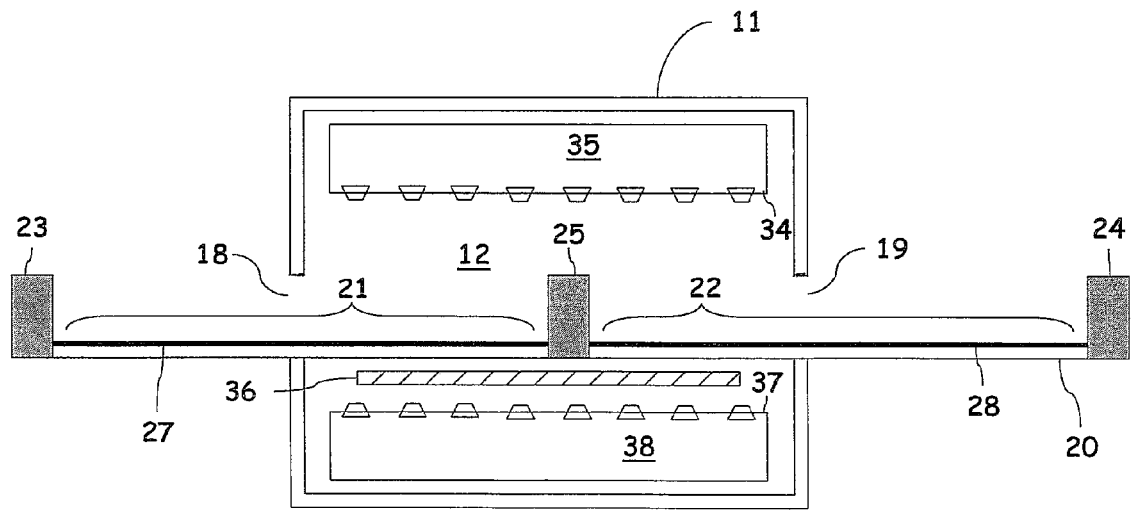
FIG. 2 is a cross-sectional view of a cavity within the matchbox oven from FIG. 1, in accordance with a preferred embodiment of the present invention.

With reference now to FIG. 2, there is depicted a cross-sectional view of housing 11, in accordance with a preferred embodiment of the present invention. As shown, housing 11 accommodates slider 20 having a first food loading section 21 and a second food loading section 22. The surfaces of first and second food loading sections 21, 22 are substantially planar. First and second food loading sections 21, 22 are configured to receive cooking plates 27, 28, respectively. Any food item intended to be cooked by matchbox oven 10 is initially placed on either one of cooking plates 27, 28. Cooking plates 27, 28 can be identical or different from each other, depending on the types of food items to be prepared. Thus, cooking plate 27 may be made of a different material and/or a different design from cooking plate 28.

Preferably, operating parameters for matchbox oven 10 to cook any food items placed on food loading section 21 to be carried into cavity 12 through first opening 18 can be entered at first control panel 15 (from FIG. 1). Similarly, operating parameters for matchbox oven 10 to cook any food items placed on food loading section 22 to be carried into cavity 12 through second opening 19 can be entered at second control panel 16 (from FIG. 1).

When food loading section 21 is located inside cavity 12 where food is being cooked, food loading section 22 is located outside housing 11 where it is being cooled by the ambient air of a kitchen in which matchbox oven 10 resides. Similarly, when food loading section 22 is located inside cavity 12 where food is being cooked, food loading section 21 is located outside housing 11 where it is being cooled by the ambient air of the kitchen in which matchbox oven 10 resides. Due to the large temperature differential between the cooled food loading section 21 (or food loading section 22) and cavity 12, food loading section 21 (or food loading section 22) can be sent into cavity 12 to rapidly bring down the temperature of cavity 12, when necessary, after food loading section 21 (or food loading section 22) has been sufficiently cooled down by the ambient air. In essence, the air-cooled food loading section 21 (or food loading section 22) serves as a heat sink for absorbing the heat within cavity 12. From a time-saving standpoint, this maneuver is particularly advantageous in getting matchbox oven 10 ready for cooking a food item that requires a lower cooking temperature than the current temperature of cavity 12. This is because it takes less time to raise the temperature of cavity 12 up to the desired temperature by the heating and airflow system (after cavity 12's current temperature has been lowered by one of food loading sections 21-22) than to lower cavity 12's current temperature down to the desired temperature by allowing heat to escape from cavity 12.

Slider 20 also includes a first stopper 23, a second stopper 24 and a third stopper 25. Third stopper 25 serves as a divider between first and second food loading sections 21, 22 as well as an oven cover to prevent heat within cavity 12 from escaping through openings 18, 19. Along with third stopper 25, first and second stoppers 23, 24 serve as oven covers to prevent heat within cavity 12 from escaping through openings 18, 19, depending on the placement of slider 20 in relation to cavity 12. For example, first and third stoppers 23, 25 can serve as oven covers for first and second openings 18, 19, respectively. Similarly, third and second stoppers 25, 24 can serve as oven covers for first and second openings 18, 19, respectively.

Slider 20 is connected to a stepper motor (not shown) that powers the linear movement of slider 20 in and out of cavity 12. Although slider 20 is moved by a stepper motor, it is understood by those skilled in the art that slider 20 can also be moved manually via a lever system or by a variety of other motorized movement designs.

In addition, housing 11 also contains a top plenum 35 and a bottom plenum 38. Top plenum 35 is connected to a top nozzle plate 34. Bottom plenum 38 is connected to a bottom nozzle plate 37. Top nozzle plate 34, top plenum 35, bottom nozzle plate 37 and bottom plenum 38 are part of the heating and airflow system for matchbox oven 10 such that heated air in top plenum 35 and bottom plenum 38 are in gaseous communication with cavity 12 through top nozzle plate 34 and bottom nozzle plate 37, respectively. Top nozzle plate 34 and bottom nozzle plate 37 include multiple conical shape nozzles for directing hot pressured airstream towards any food items placed on the portion of slider 20 located within cavity 12. Although air passes through top nozzle plate 34 and bottom nozzle plate 37 into cavity 12, it is understood by those skilled in the art that top plenum 35 or bottom plenum 38 could be in gaseous communication with cavity 12 via a variety of air opening configurations such as tubes, rectangular openings and the like. Moreover, air can enter cavity 12 through only one of top plenum 35 or bottom plenum 38.

For additional heating, an optional infrared radiation heating element 36 can be placed within cavity 12 somewhere between slider 20 and bottom nozzle plate 37 or between slider 20 and top nozzle plate 34 for supplying heat towards any food located on first loading section 21 or second loading section 22 of slider 20. It is understood by those skilled in the art that other heating elements, such as microwave, steam or a combination thereof, can be used instead of infrared radiation heating element 36.

Figure 3:
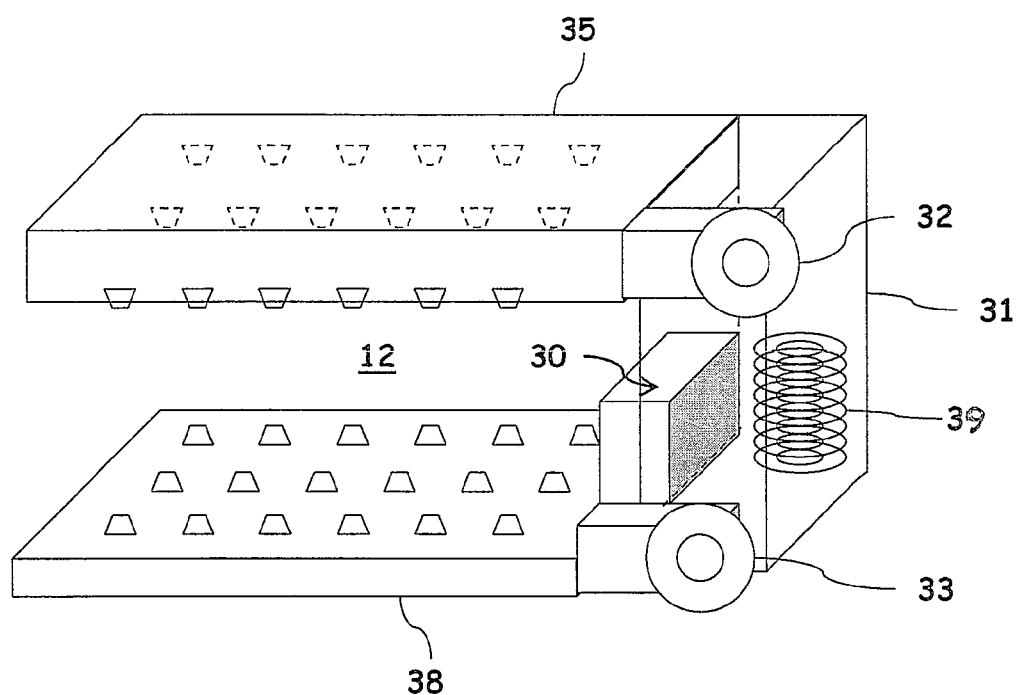
FIG. 3 is a diagram of a heating and airflow system within the matchbox oven from FIG. 1, in accordance with a preferred embodiment of the present invention.

Referring now to FIG. 3, there is depicted a diagram of the heating and airflow system within matchbox oven 10, in accordance with a preferred embodiment of the present invention. Air within cavity 12 is initially pumped in to a heater plenum 31 via an intake opening 30. Heater plenum 31 includes a heater 39. After it has been sufficiently heated by heater 39, the hot air is then directed to top plenum 35 via a top blower 32 and to bottom plenum 38 via a bottom blower 33. The pressurized hot air formed within top plenum 35 is subsequently directed to cavity 12 via multiple nozzles located on top nozzle plate 34 (from FIG. 2). Similarly, pressurized hot air formed within bottom plenum 38 is subsequently directed to cavity 12 via multiple nozzles located on bottom nozzle plate 37 (from FIG. 2). Although heated air is shown to be sent to top air plenum 35 and bottom plenum 38 via separate blowers, it is understood by those skilled in the art that heated air can be sent to both top plenum 35 and bottom plenum 38 via a single blower.

With reference now to FIG. 4a, there is depicted a top view of slider 20, in accordance with a preferred embodiment of the present invention. As shown, slider 20, which includes first and second food loading sections 21-22 and stoppers 23-25, is supported by a first pair of rails 42, 43 and a second pair of rails 44, 45. The linear movement of slider 20 on top of rails 42, 43 is preferably powered by a stepper motor 41. The widths of stoppers 23-25, which are preferably the same, are wider than the thickness of openings 18, 19. Thus, two of stoppers 23-25 can serve as oven covers to prevent heat within cavity 12 from escaping through openings 18, 19, depending on the placement of slider 20 in relation to cavity 12. Although three stoppers 23-25 are shown in the preferred embodiment, it is possible to employ less than three stoppers on slider 20 at the expense of a higher heat loss from cavity 12.

With reference now to FIGS. 4b-4c, there are depicted two side views of slider 20, in accordance with a preferred embodiment of the present invention. In FIG. 4b, first food loading section 21 is shown to be located within cavity 12, with first and third stoppers 23, 25 positioned centrally within first and second openings 18, 19, respectively. In this position, first and third stoppers 23, 25 serve as oven covers for first and second openings 18, 19, respectively. In FIG. 4c, second food loading section 22 is shown to be located within cavity 12, with third and second stoppers 25, 24 positioned centrally within first and second openings 18, 19, respectively. In this position, third and second stoppers 25, 24 serve as oven covers for first and second openings 18, 19, respectively.

In FIGS. 4b-4c, stoppers 23-25 are shown to be positioned centrally within openings 18-19. However, during a cooking cycle, slider 20 can be moved to-and-from slightly and repeatedly to allow the edges of two of stoppers 23-25 to flush with openings 18-19 of housing 11. Such movements are designed to avoid overheating of a food item at any spot located directly underneath a nozzle. The distance within which slider 20 can be moved to-and-from is preferably dictated by the widths of stoppers 23-25 in order to avoid heat loss from cavity 12 during such movements.

Referring now to FIGS. 5a-5c, there are illustrated a method of cooking when only one of food loading sections 21, 22 of slider 20 is used, in accordance with a preferred embodiment of the present invention. An uncooked raw food item (RF) is initially placed on food loading section 22 (or 21), as shown in FIG. 5a. An operator then enters an appropriate cook settings for cooking the food item via control panel 16 (or 15), and food loading section 22 (or 21) is subsequently moved within cavity 12, as depicted in FIG. 5b. After a period of time has lapsed, food loading section 22 (or 21) exits cavity 12, and the fully cooked food item (CF) is ready to be removed from food loading section 22 (or 21) by an operator, as shown in FIG. 5c.

With reference now to FIGS. 6a-6f, there are illustrated a method of cooking when both food loading sections 21, 22 of slider 20 are being used, in accordance with a preferred embodiment of the present invention. A first uncooked raw food item (RF-1) is initially placed on food loading section 22, and an operator then enters an appropriate cook setting for cooking the first food item via control panel 16, as shown in FIG. 6a. Food loading section 22 is subsequently moved inside cavity 12, as depicted in FIG. 6b. While the first food item is being cooked (F-1-C), a second uncooked raw food item (RF-2) can be placed on food loading section 21, and the operator enters an appropriate cook settings for cooking the second food item via control panel 15, as depicted in FIG. 6c. After a period of time has lapsed, food loading section 22 on which the first food item is fully cooked (CF-1) exits cavity 12 while food loading section 21 is moved inside cavity 12, as shown in FIG. 6d. While the second food item is being cooked (F-2-C), the fully cooked first food item (CF-1) is ready to be removed by the operator from food loading section 22, as shown in FIG. 6e.

While the second food item is being cooked (F-2-C), a third uncooked raw food item (RF-3) can be placed on food loading section 22, and the operator enters an appropriate cook settings for cooking the third food item via control panel 16, as depicted in FIG. 6f.

The above-mentioned sequence can be performed repeatedly for different food items. Since different cooking times can be entered by a foodservice personnel, any of the above-mentioned food items can be completely different from each other.

In addition, an interrupt mode can be added to matchbox oven 11. For certain food items, a foodservice personnel may require to interrupt the normal cooking cycle by entering a cook temperature that is less than the preset cook temperature of matchbox oven 11. If the newly entered cook temperature is approximately within 20% less than the preset cook temperature of matchbox oven 11, the process of cooling cavity 12's temperature can be accelerated by using one of food loading sections 21, 22 that has been cooled by ambient air of a kitchen as a heat sink to lower the temperature of cavity 12. For much of the duration of the cook cycle, the preset temperature of matchbox oven 11 at which the temperature feedback loop operates is temporarily lowered to the new temperature entered by the foodservice personnel. Once the cook cycle is near completion, the preset temperature of matchbox oven 11 reverts back to the original preset temperature so that the next cooking cycle will not start from an unacceptably low starting temperature.

As has been described, the present invention provides a matchbox oven for continuously and efficiently cooking a wider variety of food items while minimizing heat loss, resulting in improved energy efficiency.

While the invention has been particularly shown and described with reference to a preferred embodiment, it will be understood by those skilled in the art that various changes in form and detail may be made therein without departing from the spirit and scope of the invention.

What is claimed is:

1. An oven comprising:
   a housing including a cavity having first and second openings;
   a slider for receiving food items, wherein a first portion of said slider is located within said cavity, and wherein a second portion of said slider located outside said cavity is configured to be moved into said cavity through one of said first and second openings to serve as a heat sink for absorbing the heat within said cavity;
   a plurality of stoppers located on said slider, wherein said slider is configured to be moved to a position in said cavity such that two of said plurality of stoppers cover said first and second openings to prevent heat within said cavity from escaping through said first and second openings;
   a mover operatively connected to said slider to linearly move said slider bidirectionally for moving a first food item placed on said slider in and out of said cavity through said first opening and for moving a second food item placed on said slider in and out of said cavity through said second opening;
   a heat source for providing heat to said cavity for heating up any food item placed within said cavity; and wherein a first cook setting of said oven when said first portion is within said cavity and a second cook setting of said oven when said second portion is within said cavity are independently controllable.

2. The oven of claim 1, wherein said mover moves said slider to-and-from within the width of one of said plurality of stoppers during a cooking cycle.

3. The oven of claim 1, wherein said plurality of stoppers includes first, second and third stoppers.

4. The oven of claim 1, wherein said slider comprises first and second food loading sections divided by one of said plurality of stoppers.

5. The oven of claim 4, wherein said first and second food loading sections include substantially identical cooking plates.

6. The oven of claim 4, wherein said first and second food loading sections include different cooking plates.

7. The oven of claim 1, wherein said mover is a stepper motor.

* * * * *

UNITED STATES PATENT AND TRADEMARK OFFICE
CERTIFICATE OF CORRECTION

| | | Page 1 of 1 |
|---|---|---|
| PATENT NO. | : 8,733,236 B2 | |
| APPLICATION NO. | : 13/236695 | |
| DATED | : May 27, 2014 | |
| INVENTOR(S) | : Philip R. McKee | |

It is certified that error appears in the above-identified patent and that said Letters Patent is hereby corrected as shown below:

In the Specification

Column 5, line 3, delete "to-and-from" and insert --to-and-fro--, therefor.

Column 5, line 8, delete "to-and-from" and insert --to-and-fro--, therefor.

In the Claims

Column 6, line 48, claim 2, delete "to-and-from" and insert --to-and-fro--, therefor.

Signed and Sealed this
Fifth Day of August, 2014

Michelle K. Lee
*Deputy Director of the United States Patent and Trademark Office*